(12) United States Patent
Elder

(10) Patent No.: US 9,544,166 B2
(45) Date of Patent: *Jan. 10, 2017

(54) ACCESS GATEWAY MANAGEMENT SYSTEM

(71) Applicant: Genband US LLC, Frisco, TX (US)

(72) Inventor: Joseph Marcus Elder, Boulder, CO (US)

(73) Assignee: GENBAND US LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,813

(22) Filed: Oct. 17, 2014

(65) Prior Publication Data

US 2015/0036680 A1    Feb. 5, 2015

Related U.S. Application Data

(63) Continuation of application No. 14/039,843, filed on Sep. 27, 2013, now abandoned, which is a continuation of application No. 12/881,625, filed on Sep. 14, 2010, now Pat. No. 8,570,855.

(60) Provisional application No. 61/242,475, filed on Sep. 15, 2009.

(51) Int. Cl.
| | |
|---|---|
| *H04L 29/06* | (2006.01) |
| *H04L 12/66* | (2006.01) |
| *H04L 12/24* | (2006.01) |
| *H04M 7/00* | (2006.01) |

(52) U.S. Cl.
CPC .............. *H04L 12/66* (2013.01); *H04L 41/022* (2013.01); *H04M 7/006* (2013.01)

(58) Field of Classification Search
CPC .... H04L 29/06027; H04L 29/06; H04L 45/00; H04L 3/0685; H04L 3/0664
See application file for complete search history.

(56) References Cited

U.S. PATENT DOCUMENTS

| | | | | |
|---|---|---|---|---|
| 5,616,225 | A * | 4/1997 | Sieck | C23C 14/54 204/192.12 |
| 5,680,391 | A * | 10/1997 | Barron | H04Q 11/045 370/241 |
| 5,857,011 | A * | 1/1999 | Kennedy | H04M 3/30 379/21 |
| 6,453,014 | B1 * | 9/2002 | Jacobson | H04L 1/24 379/26.01 |

(Continued)

*Primary Examiner* — Andrew Lee
(74) *Attorney, Agent, or Firm* — Haynes and Boone, LLP

(57) ABSTRACT

An Access Gateway Management System (AGMS) allows telephone operating companies to transition their existing wireline customers over to Voice over the Internet Protocol (VoIP) technology without having to invest in new workflow processes, systems, or maintenance facilities by adapting the Operational Support Systems interfaces currently employed for managing legacy circuit-switched switching systems to manage Line Access Gateways (LAGs), which are the generic line termination systems employed in VoIP infrastructure. The AGMS also configures and adapts metallic loop test systems currently deployed for the purpose of routine maintenance and troubleshooting of subscriber lines terminating directly or indirectly (through access systems) on existing switching systems to continue to provide this functionality when the lines terminate on LAGs. Synchronization of the subtended LAGs is coordinated with the legacy network by the AGMS.

22 Claims, 8 Drawing Sheets

(56) References Cited

U.S. PATENT DOCUMENTS

| | | | |
|---|---|---|---|
| 6,708,207 B1* | 3/2004 | Sabelhaus | H04L 41/0213 370/466 |
| 6,968,553 B1* | 11/2005 | Theeten | H04L 29/06 709/223 |
| 6,975,636 B2 | 12/2005 | Eom | |
| 7,633,896 B2 | 12/2009 | Doshi et al. | |
| 7,760,657 B1 | 7/2010 | Hogg | |
| 7,958,225 B2* | 6/2011 | Schofield | H04L 67/325 709/224 |
| 8,782,282 B1* | 7/2014 | Zhou | H04L 41/50 709/203 |
| 2001/0033550 A1* | 10/2001 | Banwell | H04L 41/0213 370/254 |
| 2002/0004828 A1 | 1/2002 | Davis et al. | |
| 2002/0027923 A1 | 3/2002 | Tokunaga et al. | |
| 2002/0064152 A1 | 5/2002 | Lemley et al. | |
| 2002/0191760 A1* | 12/2002 | Wattwood | H04L 12/4608 379/93.01 |
| 2003/0198218 A1 | 10/2003 | Farris et al. | |
| 2004/0062272 A1 | 4/2004 | Greco et al. | |
| 2004/0242230 A1 | 12/2004 | Rue | |
| 2005/0220180 A1 | 10/2005 | Barlev et al. | |
| 2005/0271029 A1 | 12/2005 | Iffland | |
| 2006/0253563 A1* | 11/2006 | Yang | H04L 12/24 709/223 |
| 2007/0094403 A1* | 4/2007 | Colven | H04L 67/322 709/230 |
| 2007/0189497 A1 | 8/2007 | Bareis | |
| 2008/0101401 A1 | 5/2008 | Storry et al. | |
| 2009/0154484 A1 | 6/2009 | Reesor et al. | |
| 2009/0161556 A1 | 6/2009 | Qian et al. | |
| 2009/0238083 A1 | 9/2009 | Yoshida | |
| 2010/0020702 A1 | 1/2010 | Wong et al. | |
| 2010/0082632 A1* | 4/2010 | Kumar | G06F 17/30292 707/741 |
| 2010/0118877 A1 | 5/2010 | Devine et al. | |
| 2010/0142541 A1 | 6/2010 | Murase et al. | |
| 2010/0332638 A1 | 12/2010 | Lewis | |
| 2011/0058468 A1 | 3/2011 | Singh et al. | |
| 2012/0144463 A1 | 6/2012 | Satarasinghe et al. | |

* cited by examiner

TEST ACCESS SW. 304 CONFIGURED FOR NORMAL SERVICE

TEST ACCESS SW. 504 CONFIGURED FOR TESTING

ACCESS GATEWAY MANAGEMENT SYSTEM

RELATED APPLICATION

The present application is a continuation of U.S. Non-Provisional patent application Ser. No. 14/039,843, filed on Sep. 27, 2013, which is a continuation of U.S. patent application Ser. No. 12/881,625, filed on Sep. 14, 2010, now U.S. Pat. No. 8,570,855, which claims benefit of U.S. Provisional Patent Application No. 61/242,475, filed on Sep. 15, 2009, the full disclosures of which are hereby incorporated by reference.

BACKGROUND OF THE INVENTION

Field of the Invention

The present invention relates generally to the field of wireline voice telephony. More specifically, the present invention discloses an Access Gateway Management System (AGMS) that enables telephone operating companies to transition to "Voice over the Internet Protocol" (VoIP) networking while preserving the operational support infrastructure that is currently in place.

Statement of the Problem

In the applications considered herein, VoIP Line Access Gateways (LAGs) are used to terminate subscriber lines exiting directly from a telephone company wire center as well as the digital signals (nominally T1s) that support access systems (normally remote) that provide telephone service to additional subscribers. The use of VoIP allows telephone companies to rationalize all of their data, wireline voice, and wireless services into a single IP network, this transition is presently in its infancy.

Currently, directly-terminated subscriber lines and access systems are supported by legacy voice switches and in the larger telephone operating companies, particularly in the Regional Bell Operating Companies (RBOCs), these legacy switching systems and the ancillary systems that provide telephone services to the subscribers associated with that switch and wire center are managed, tested, maintained, inventoried, and trouble-shot by means of a complex and inter-related set of Operational Support Systems (OSSs). These OSSs allow "flow through" of service orders to provision and test all of the facilities and equipment in an automated fashion and generating specific work orders for craft where necessary.

These OSSs and the wire centers that they manage have strong geographic ties which are both historical and very necessary to supporting a wireline network. This is in contradistinction to IP network elements which have functional properties such as routers, soft switches, and user agents but little sense of geographical presence. Herein lies a problem in the art.

SUMMARY OF THE INVENTION

The present invention provides a system and method that emulates a legacy voice switch with respect to the existing OSSs thus providing for the management of VoIP-based voice services in the same manner as with legacy voice switching. This system supports a plurality of access gateways in a wire center by providing the OSS infrastructure on the network side with a single geographically logical interface while adapting on the access gateway side to management interfaces consistent with IP network elements. This Access Gateway Management System (AGMS) preserves the operational, administration, provisioning/service activation, and network maintenance infrastructure currently deployed along with the resulting workflows for telephone company craft while migrating a converged (all IP) network.

BRIEF DESCRIPTION OF THE DRAWINGS

A more complete understanding of this invention may be obtained from a consideration of this specification taken in conjunction with the drawings, in which.

DETAILED DESCRIPTION OF THE INVENTION

Figure 1:
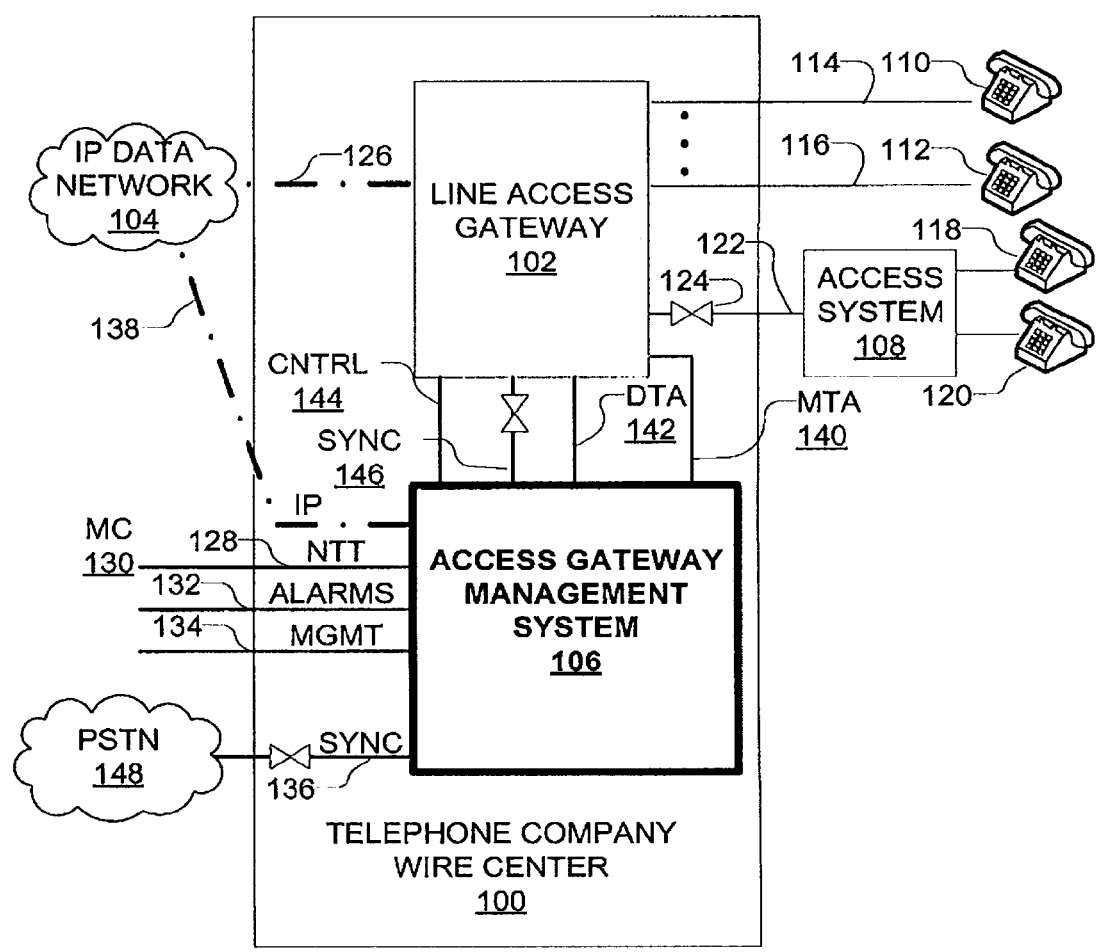
FIG. 1 is a block diagram of a telephone company wire center wherein a plurality of VoIP line access gateways are operational and in which an exemplary embodiment of this invention is implemented.

FIG. 1 is a block diagram of a telephone company wire center 100 wherein an exemplary embodiment of this invention operates. In the context of FIG. 1, the telephone company is providing service to at least a subset of the subscribers in this office using Voice over the Internet Protocol (VoIP) technology. In this figure there are a plurality of subscriber lines 114, 116 terminating directly on a Line Access Gateway (LAG) 102 and providing telephone service to subscriber station equipment 110, 112. Also shown is an Access System 108 which would normally be located remotely from wire center 100 providing service to a plurality of subscriber lines 118, 120. Access system 108 may also be referred to as a Digital Loop Carrier (DLC), Subscriber Loop Carrier (SLC), Multi-Service Access Platform (MSAP), all of which are generically referred to herein as "access systems". Access system 108 will typically terminate on line access gateway 102 using a digital signal such as one or more T1s represented in this figure as 122 with repeater symbol 124 to clarify that this is a T1. One conversant in the art will appreciate that the actual transport means carrying the T1 signals can be fiber optic, radio, or T1 repeatered spans without loss of generality. It is the function of line access gateway 102 to correctly terminate the subscriber lines and access systems on the right side and convert both the signaling and voice traffic arising from these interfaces into those consistent with VoIP network. This VoIP signaling and voice traffic is then communicated to a serving IP Data Network 104 by IP transport means 126. This conversion functionality between conventional telephone network elements and a VoIP network are well understood in the art, is not contributory to the understanding of the present invention, and will not be discussed further.

Also shown in FIG. 1 in heavy block and bold font is the Access Gateway Management System (AGMS) 106 which is the subject of the present invention. The AGMS interfaces to much of the legacy infrastructure of the traditional telephone network and adapts these functions to be applicable to an access gateway operating in a VoIP environment.

Figure 2:
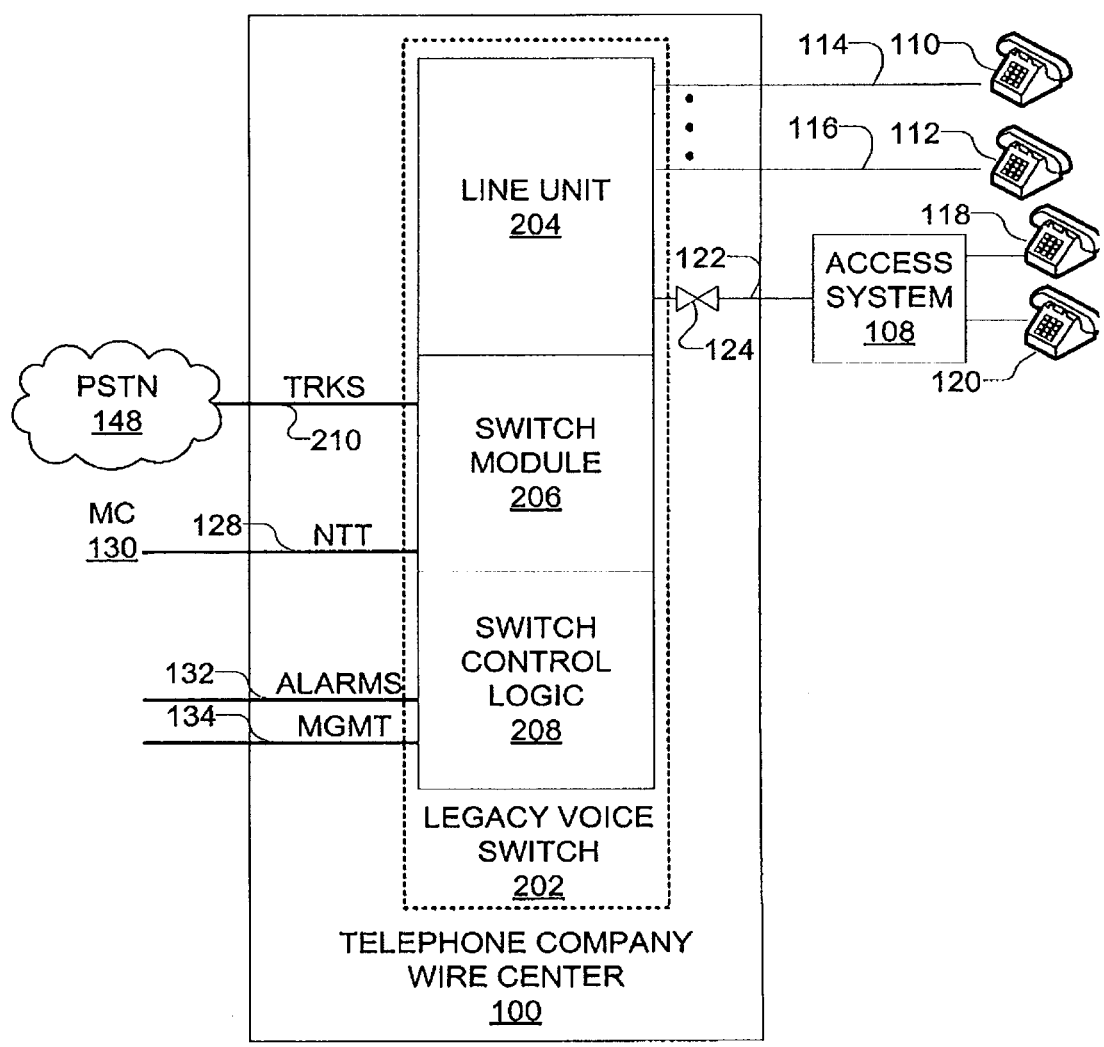
FIG. 2 is a block diagram depicting a telephone company wire center of wherein a legacy switching system is operational prior to conversion to VoIP networking illustrating management requirements.

In order for the reader to better appreciate the functional context of the AGMS, the discussion now passes to FIG. 2 which depicts a conventional (legacy) voice switch 202 which could have been providing service in wire center 100 prior to conversion to VoIP. For simplicity, voice switch 202 is comprised of three subsystems: Line Unit 204 which terminates the subscriber side services, Switch Module 206 which provides for connectivity between subscriber circuits and/or trunks, and Switch Control Logic 208 to which the other subsystems are responsive and which provides the control of voice switch 202. To facilitate this discussion, and without loss of generality, it is assumed that the same subscriber set that terminates on line access gateway 102 of FIG. 1 terminated originally on line unit 204. Connectivity to the Public Switched Telephone Network (PSTN) 148 is made through a number of trunks 210 by means of switch module 206 responsive to control logic 208. This configuration is used herein for convenience and clarity in describing the invention. It is well known in the art that the wire center 100 is part of the PSTN 148. In a like manner, No Test Trunk (NTT) 128 by means of switch module 206 has metallic access to the plurality of subscriber pairs 114, 116 terminating directly on line unit 204 as well as the plurality of subscriber pairs 118, 120 terminating indirectly on line unit 204 through access system 108 by a mechanism to be described.

The switch control logic 208 may report alarm conditions that are detected in relation to the operation of all aspects of legacy voice switch 202 and also accept alarm indications from ancillary systems with which it interoperates by means of an alarm interface 132. The management interface 134 provides communications means by which external Operational Support Systems (OSSs) can interact with the legacy voice switch 202. These operational support systems' role in the management of these systems can be quite broad in scope including but not limited to: provisioning new functionality or equipment, adding/deleting subscribers, causing maintenance actions, retrieving operational reports and alarm logs.

The reader's attention is now redirected to FIG. 1. The AGCS 106 is configured so as to present consistent interfaces to the legacy voice operational infrastructure while adapting this functionality to manage VoIP access gateways. In accordance with one aspect of this invention, AGMS 106 interfaces to the No Test Trunk (NTT) 128, so called because it does not check for busy/idle status prior to connecting to a circuit. The NTT is a means by which a Maintenance Center (MC) 130 can interact with a conventional voice switch. In a manner to be described, AGMS 106 accepts and processes the signaling over NTT 128 by which the Maintenance Center 130 requests a subscriber line for testing, as would be expected of a conventional voice switch. AGCS 106 then identifies the appropriate line access gateway associated with this line appearance (e.g., LAG 102) and translates and communicates that test request to line access gateway 102 by either by means of the IP connection 138 or a separate control interface 144. AGMS 106 then causes metallic connectivity to be made between NTT 128 and Metallic Test Access (MTA) bus 140. Under some circumstances, the test request by maintenance center 130 over NTT 128 may necessitate a second, non-metallic, test channel which is connected to line access gateway 102 by means of Digital Test Access bus 142 or through IP network 104 in a manner to be described.

In accordance with another aspect of this invention, the alarms interface 132 is managed by AGMS 106 so as to be consistent with interoperation with a legacy voice switch. The alarm interface 132 commonly provides relay contact closures for signaling out to local alarming systems which could provide audible and/or visual alarms to alert local craft as well as interface to alarm telemetry systems which communicate alarm status to telephone company operational centers. In addition, the alarm interface 132 will commonly contain inputs wherein ancillary equipment, such as transport or environmental systems, may alert the legacy switch that a problem has occurred. AGMS 106 accordingly polls the subtended line access gateways (e.g., LAG 102) for problems over the IP communications link 138 or control means 144 and interprets those problems appropriately for presentation over the alarm interface 132. In a similar manner, AGMS 102 interprets alarm inputs from other systems on alarm interface 132 and provides appropriate messages to the line access gateway 102.

The management interface 134 normally communicates by means of a data network to automated Operational Support Systems (OSSs) as well as occasionally to a person by means of a control terminal. In the Regional Bell Operating Companies (RBOCs) most of these OSSs for legacy voice networks are maintained by Telcordia Technologies of Piscataway, N.J. and consist of multiple "modules" that implement different management functionality and interact with different "classes" of network elements. Examples of some of the Telcordia OSS modules include: SWITCH® which manages legacy switches, NMA® which does network surveillance, and TIRKS® which inventories and assigns central office facilities, all of which are well known to those conversant in the art. Smaller telephone companies often only implement a subset of these capabilities; therefore the RBOC OSSs probably represent the most complete set of capabilities.

In accordance with another aspect of this invention, AGMS 106, communicates with the various OSSs through the management interface (MGMT) 134 in a manner analogous to that of a legacy voice switch while translating and communicating relevant management information to and from the line access gateway 102 via IP over connection 138 or by means of control interface 144. The interfaces to the OSSs via management interface 134 do not need to be identical to that of any existing legacy switch in that Telcordia Technologies supports a process known as OSMINE which enables customization of these OSSs to meet the needs of specific network elements such as AGMS 106.

VoIP network elements such as line access gateways 102 require a stable timing source that is preferably shared among all of the network elements that communicate within a network. There are methods that have been proposed for deriving this timing solely from the IP network; however, in accordance with another aspect of this invention, a synchronization signal (SYNC) 136 derived from the PSTN 148 is processed by AGMS 106 and presented in a suitable but synchronous format to the line access gateways (e.g., LAG 102) that are co-resident with AGMS. Such a subsidiary synchronization signal 146, is shown providing timing to line access gateway 102 from AGMS 106. Commonly, T1s are used for synchronization distribution and both synchronization signal 136 and 146 are T1s in the preferred embodiment.

Figure 3:
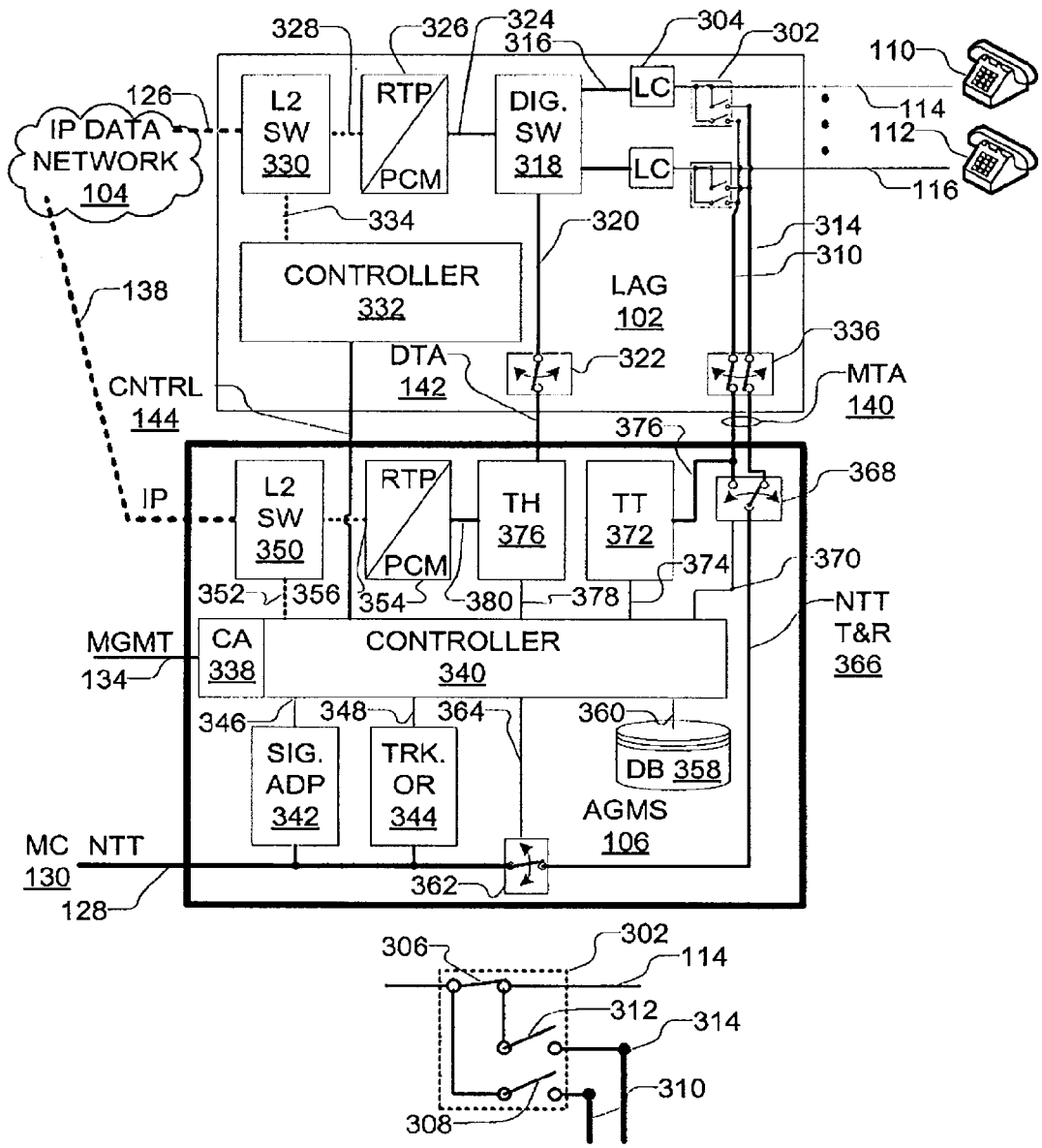
FIG. 3 is a block diagram depicting the functional details of an exemplary embodiment of the instant invention expanding upon FIG. 1 with particular attention to test access.

FIG. 3 depicts an exemplary embodiment of the AGMS 106 with expanded detail to illustrate the interoperation of NTT 128 with AGMS 106 and the interfaces and functionality adapted to correctly interconnect with LAG 102. In FIG. 3 certain functions and subsystems of LAG 102 are illustrated for clarification of the operation of the instant invention and do not constitute part of this invention nor does the exemplary embodiment of LAG 102 in any way limit the generality of these teachings. Beginning with the subscriber line interface side of LAG 102, Line Circuit (LC) 304 provides on the subscriber (right) side all of the analog functionality that is required to source loop current, provide ringing, monitor busy/idle status and protect against overvoltage threats while on the network (left) side interfaces digital Pulse Code Modulation (PCM) which codes the audio signals separated by direction of travel, represented here as signal 316. The line circuit 304 is standard in the art and will not be described further. By means of signal 316, the PCM from LC 304 is passed to digital switch 318 which permits the interconnection of a plurality of inputs and outputs specifically to digital test access (DTA) 142 by means of signal 320 and switch 322 as well as PCM-to-RTP (Real Time Protocol) converter 326 by means of signal 324. PCM-to-RTP converter 326 is usually implemented as a Digital Signal Processor (DSP) which converts the PCM into RTP packets (and vice versa) which are then carried by an IP network. The converter 326 is standard in the art and will not be discussed further. The output of converter 326, signal 328 (shown as a dotted line to indicate packet data), transitions layer 2 switch (L2 SW) 330 to the IP data network 104 by means of signal 126. A practitioner of the art will appreciate that there are intermediate circuitry required between layer 2 switch 330 and physical media 126. Layer 2 switch 330 also permits controller 332 communications with IP network 104 or the RTP packets on signal 328 by means of signal 334.

Returning to the subscriber line interfaces, subscriber line 114 is connected to line circuit 304 by means of test access switch 302 which is depicted in greater detail at the bottom of FIG. 3 and comprises: break switch 306 which interrupts continuity between subscriber line 114 and line circuit 304, test-in switch 308 which provides access to test-in bus 310, and test-out switch 312 which provides access to test-out bus 314. By means of this arrangement, which is standard in the art, line circuit 304 may be isolated from the subscriber line and connected to a test-in bus 310 while subscriber line 114 is connected to test-out bus 314. For normal operation; that is, not in the test mode, the switches 308, 312 are open while switch 306 is closed as shown in the detail diagram at the bottom of FIG. 3. As is well-known in the art, subscriber line 114 consists of two conductors designated in North America as "tip" and "ring" depicted herein as a single line is for clarity and convenience.

Test-in bus 310 and test-out bus 312 comprise components of the metallic test access (MTA) 140 when selectively connected via switch 336. Switches 322, 336, responsive to controller 332 remain normally open until instructed by AGMS 106 to close through control means 144 or through IP network 104 in preparation for a test cycle thus permitting a plurality of line access gateways (not shown) to be accommodated on shared test buses.

Returning to the discussion of the operation of AGMS 106 in FIG. 3, a test cycle may be initiated spontaneously by AGCS 106, by means of a control message over management channel (MGMT) 134, or by signaling occurring on NTT 128, any of which may result from an automated or manual request. Management channel 134 may take the form of serial communications or packet-based networking examples of which include but are not limited to: RS-232, RS-485, X.25, and TCP/IP. Communications adapter (CA) 338, which may be integral to or separate from controller 340 adapts the physical signals and protocols of management channel 134 so as to be understandable by the controller 340. In RBOCs and in the OSSs maintained by Telcordia Technologies the management messages are most commonly in Transaction Language 1 (TL1); however diverse protocols and messaging formats can be accommodated within the scope of these teachings.

Should the test request arise from the maintenance center 130 by means of NTT 128, trunk signaling will alert the controller 340 through signaling adapter 342 and control signal 346 that a request is incoming. NTT 128 consists of metallic test pair, designated tip (T) and ring (R), as well as signaling leads, sleeve (S) and sleeve ground (SG). The operation of an NTT is standard in the art and documented in standards document, GR-536-CORE, published and maintained by Telcordia Technologies and will only be discussed here where it is helpful for the reader to understand the operation of this invention. Placing the terminations on the leads of NTT 128 and sensing responses takes place in signaling adapter (SIG ADP) 342 through control means 346 responsive to controller 340. When NTT 108 is idle, signaling adapter 342 attaches talk battery (nominally −48V) to the ring lead through a current sensor and ground to the tip lead, current flowing between tip and ring indicates a seizure of the trunk by a test system. If AGMS 106 is ready to receive digits, controller 340 causes signaling adapter 342 to reverse the terminations on tip and ring thus causing current to flow in the reverse direction indicating to the test system that digits may be pulsed out. In preparation for accepting digits, controller 340 through control means 348 activates trunk originating register (TRK OR) 344 which detects any dialed digits and applies any tones required. Signaling over NTT 128 uses conventional trunk signaling; hence, digits are pulsed using either rotary dialing (make/break) or multi-frequency (MF) digits (as distinct from Dual Tone Multi-Frequency, or DTMF, used in subscriber line signaling). MF signaling, also known as "R1 signaling" in North America is well known in the art and codified in CCITT-T Recommendation Q.310-332. The digits pulsed into NTT 128 and received by originating register 344 comprise all or a subset of the Directory Number (DN) of the subscriber line that the test system is requesting access to for test purposes which is communicated to controller 340 via communications means 348. Controller 340 must then ascertain whether this directory number is within the domain of subscriber lines terminating on subtended LAGs, and if so, which specific LAG. This process is discussed in more detail subsequently.

Standard signaling on the NTT 128 accommodates proceeding with the test or rejecting the request at the discretion of the switch (AGMS). After controller 340 has ascertained the location of the requested subscriber pair and also that the resources are available to accommodate connection (for example that the relevant test buses are not in use), controller 340 communicates to the appropriate LAG (e.g., LAG 102) as to which line appearance to make available for testing. This communication can take place over direct control means 144 or over IP network 104 using the IP communications means present in LAG 102 and AGMS 106. For the purposes of this discussion, assume that the requested subscriber line is 114 of LAG 102. When LAG 102 confirms that it has successfully reconfigured test access switch 302 by opening switch 306 and closing switches 308, 312, and 336; controller 340 causes switch 362 to close via control signal 364 which connects only the tip and ring of NTT 128 onto bus 366 (NTT T&R), controller 340 then completes the initial test setup causing by means of control signal 370 bus selector switch 368 to connect to test-out bus 314 (right). At this point, controller 340 causes signaling adapter 342 to remove terminations and detectors from the tip and ring leads of NTT 128 and signal to the test system by means of the sleeve and sleeve ground leads that the test of the requested line may proceed. The test system, by means of NTT 128, now has metallic access to subscriber pair 114 regardless of the busy/idle status and may proceed with tests on that pair. This connectivity is illustrated for clarity in FIG. 4 as NTT test path (NTT TEST) 402 with a dotted line passing through the plurality of connections that constitute the path end-to-end.

At this point we return to the discussion of relating a given directory number (DN) to a physical subscriber pair and LAG. In this exemplary embodiment and in accordance with another aspect of this invention, the controller 340 has five ways of determining where the subscriber line referenced by a DN is among those terminating on LAGs for which it is providing support, to wit: by interrogating the co-resident LAGs, by establishing a VoIP connection, by interrogating the OSSs via management channel 134, by interrogating a database associated with managing the VoIP network, or by referencing a local database (see FIG. 3). In the first case, controller 340 by means of L2 switch 350 and control signal 352, or alternatively using control means (CNTL) 144, broadcasts a request to the subtended LAGs to respond with the location of the subscriber line associated with the present DN. While straightforward, this requires a functionality within the LAG that may not be supported. In the second case, controller 340 using L2 switch 350 and control signal 352 uses conventional VoIP signaling to establish a test connection between its PCM-to-RTP converter 354 through L2 switch 350 and RTP connection 356 as a result of which it would learn the IP address of the associated LAG and, if required, further translate this into additional details by means of database (DB) 358 and connection 360. VoIP signaling protocols support test calls which only result in payload (RTP) loopback and would not complete the call to the subscriber. In the third case, controller 340 may interrogate the appropriate OSS (for example, SWITCH®) through communications adapter 338 and management channel 134. In the fourth case, the controller 340 interrogates a server associated with the VoIP infrastructure through IP data network 104. For example, this server may be an HSS (Home Subscriber Server). In the last case, controller 340, can request of local database 358 an association between a given DN and physical subscriber line location. The database 358 may be kept current through several means including but not limited to: monitoring the VoIP signaling traffic over IP network 104, updating based on management transactions occurring on management channel 134, and periodic polling of databases associated with the VoIP network.

Figure 4:
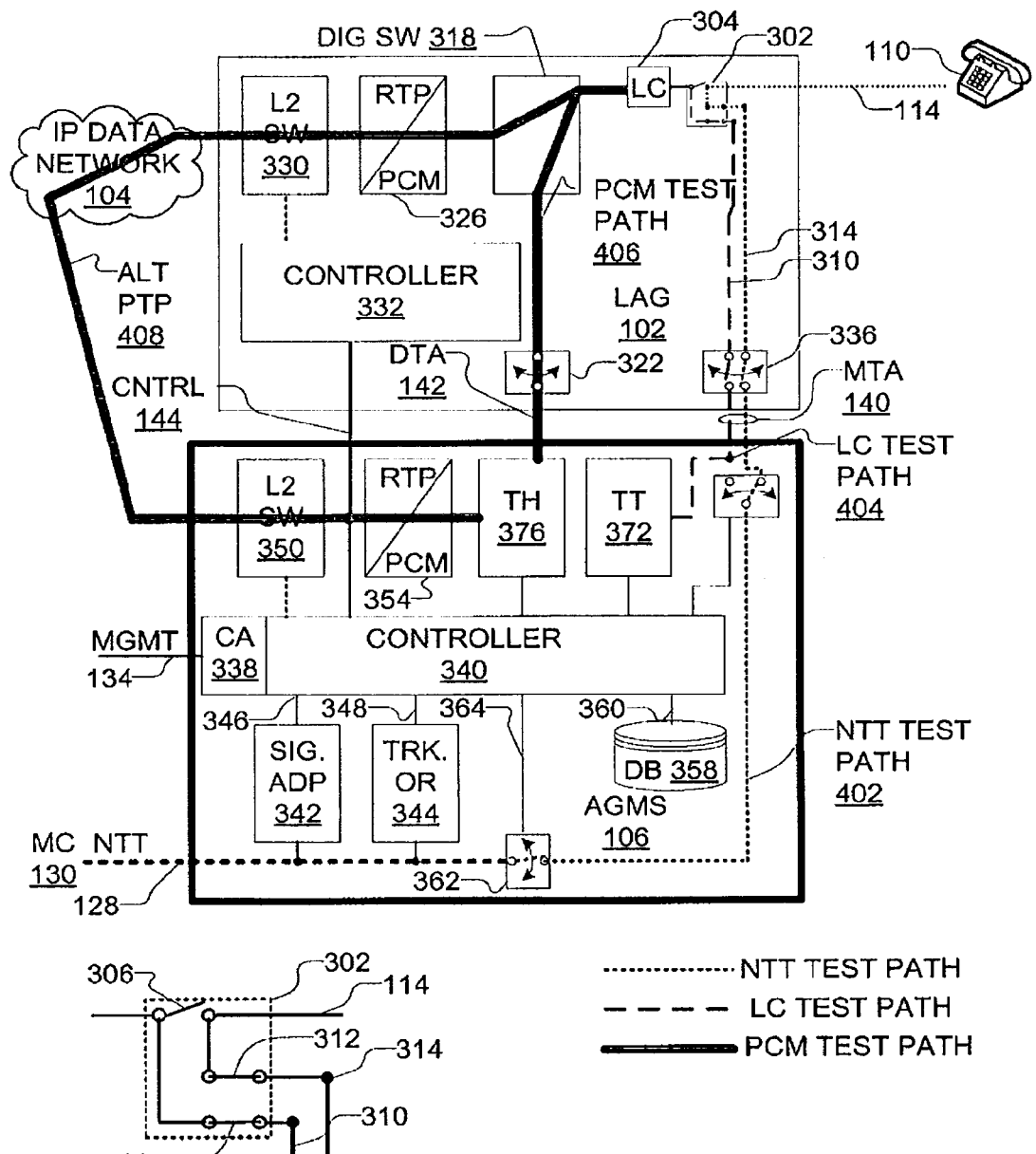
FIG. 4 is a block diagram illustrating both the metallic test paths and the PCM test paths established for the purposes of testing a subscriber line and its associated circuitry.

In some circumstances the connectivity represented by NTT test path 402 would suffice for the purposes of the test system. However, it fails to account for problems occurring in LAG 102 which could be contributory to a trouble report relating to subscriber line 114. To this end, it is customary in a legacy switching system for the switch itself to verify the proper functioning of the remainder of the voice path to the subscriber. In accordance with another aspect of this invention, in the exemplary embodiment illustrated in FIG. 3, this functionality starts with test termination module (TT) 372 which is responsive to controller 340 through control means 374. Test termination module 372 has access to LC 304 via switch 302, test-in bus 310, switch 336, metallic test access bus 140, and finally signal path 376 all of which are summarized as LC test path (LC TEST) 404 in FIG. 4 shown as a dashed line. Test termination module 372 is so configured as to be able to apply a plurality of terminations across tip and ring, and potentially between tip to ground and ring to ground, of LC 304. Examples of these terminations include, but are not limited to: open circuit (nominal case), short circuit ("reflective load"), and the nominal terminating impedance, usually 900 Ohms ("absorptive load"). The short circuit can be used to test for off-hook detection, verification of ring trip, and reflection of a tone back to the source (hence "reflective load"). The nominal terminating impedance will appropriately terminate the channel and result in minimal reflection of a test tone (hence "absorptive load"). A skilled practitioner of the art can suggest many other loads that may substitute for or replace the ones discussed without departing from these teachings.

In order to complete the test capabilities, access to the digital PCM (signal 316) stream from LC 304 is required. In accordance with another aspect of this invention, as shown in the exemplary embodiment of FIG. 3 a direct PCM path is provided by the digital test access (DTA) bus 142 and an indirect path is also provided through the IP network 104. In the case of the direct PCM test access, LAG 102 in response to setting up the metallic test access to the subscriber pair 114 directs the PCM signal 316 through the digital switch 318, signal path 320 and switch 322 (closed) onto DTA bus 142. Switch 322 permits a single DTA bus 142 to serve a multiplicity of LAGs. DTA bus 142 then terminates on test head (TH) 376 which is responsive to controller 340 through control means 378. Test head 376 can direct calibrated tones towards LC 304 and measure the reflected power levels to insure that the PCM path to LC 304 is functional. For example, if controller 340 causes test termination 372 to place an absorptive load across tip and ring of LC 304, the controller 340 would expect to measure a low level of reflected signal at test head 376. Similarly, if no signal is emitted by the test head 376, the signal level measured at the test head would approximate the idle channel noise. Conversely, if the controller 340 causes the test termination 372 to put a reflective load across tip and ring of LC 304, a large reflected signal would be expected to be measured by the test head, the level of which could be used to approximate channel losses.

Alternatively, an indirect path for testing may be provided as well. The controller 340 of AGMS 106 initiates a VoIP call using its TCP IP connection 352 through L2 switch 350 and IP connection 138 to IP network 104 using conventional VoIP signaling which would nominally be mediated by a call agent (not shown) on IP network 104. An RTP path for the bearer traffic is then established when controller 332 of LAG 102 responds through L2 switch 330 with the address of RTP/PCM converter 326 providing RTP connectivity between RTP/PCM converter 354 of AGMS 106 and RTP/PCM converter 326 of LAG 102. Furthermore, LC 304 through digital switch 318 and connecting signal paths 316,324 (all of LAG 102) has PCM connectivity via the RTP path to test head 376 of AGMS 106 by means of signal means 380.

As an aid to the reader and to clarify the status of various connections and test resources FIG. 4 removes some of the reference designators of FIG. 3 and highlights the test paths. At the bottom of FIG. 4, test access switch details show that LC 304 has been connected via test-in switch 308 to test-in bus 310 while subscriber line 114 has been connected through test-out switch 312 to test-out bus 314 and these two buses are isolated by switch 306. At a higher level, dashed line 402 (NTT TEST PATH) depicts the metallic continuity for NTT 128 to subscriber line 114 while dashed line 404 (LC TEST PATH) depicts the metallic continuity between test termination module (TT) 372 and line circuit (LC) 304. Again at a higher level, the gray highlighted line depicts the direct PCM test path (PCM TEST PATH) 406 connecting the PCM stream from LC 304 to test head (TH) 376 by means of digital test access (DTA) 142 white an alternative PCM path is depicted as gray highlighted line 408 (ALT PTP) providing equivalent PCM connectivity between LC 304 and TH 376. By these means of connectivity NTT 128 may independently metallically test the subscriber loop 114 while test head (TH) 376 and test termination module (77) 372 both responsive to controller 340 (all of AGMS 106) may independently test both the analog functioning of the LC, including signaling, and the transmission quality and continuity of the PCM transmission paths.

As long as NTT 128 maintains the sleeve and sleeve ground signaling leads in the active test state, NTT 128 remains connected through its tip and ring leads to subscriber line 114 via test path (NTT TEST PATH) 402 as well as the test path to the analog interface of LC 304 by means of test path 404 (LC TEST PATH) since test access switch 302 remains in the test access state. Testing of the PCM channel by means of the digital test access (DTA) 142 and path 406 (PCM TEST PATH) or by means of IP network 104 and alternative PCM path (ALT PTP) 406 however is decoupled from the metallic testing through NTT 128. Therefore, when the controller 340 has completed the test suite for the PCM channel, it may choose to release the paths and test assets associated with testing of the PCM channel. What remains is reporting of the results of the PCM channel and analog interface tests for subscriber line 114. This may be accomplished by autonomously or on request sending the results to an OSS via the management channel (MGMT) 134. A second approach is to signal these results of the analog interface and PCM channel tests onto the NTT 128. For example, in case of legacy switching systems, the NTT 128, through signaling on the sleeve and sleeve ground leads, requests the results of the PCM channel test which are encoded onto the tip and ring leads by means of DC terminations and in-band tone bursts. The DC terminations are useful for mechanized loop testing equipment to interrupt, while the tones burst are understandable by human operators. Both convey the same information. According to another aspect of this invention, the aforementioned strategy is adapted by AGMS 106 in the following manner. When controller 340 through signaling adapter 342, detects that the sleeve and sleeve ground leads have transitioned from the metallic test state to that state requesting the results of the PCM channel test, it causes through control means 346 signaling adapter 342 to apply the requisite terminations on the tip and ring leads while simultaneously through control means 348 causing trunk originating register 344 to apply the appropriate tone bursts. This would normally occur at the end of the testing and shortly thereafter NTT 128 would transition the sleeve and sleeve ground lead into a disconnect state which controller 340 detects through signaling adapter 342 and commences the disconnect process. This involves communicating to LAG 102 through control interface 144 or through the IP network 104 that test support is no longer required whereupon LAG 102 restores test access switch 302 to the operational state and disconnects its metallic and digital test access buses from the shared one by opening switches 336 and 322. Controller 340 of AGMS 106 causes switch 362 to open and configures signaling adapter 342 to place the NTT in the idle signaling state, releases all RTP paths related to the testing by means of TCP IP connection and L2 switch 350 and causes test head 376 and test termination module 372 to return to the idle state.

Figure 5:
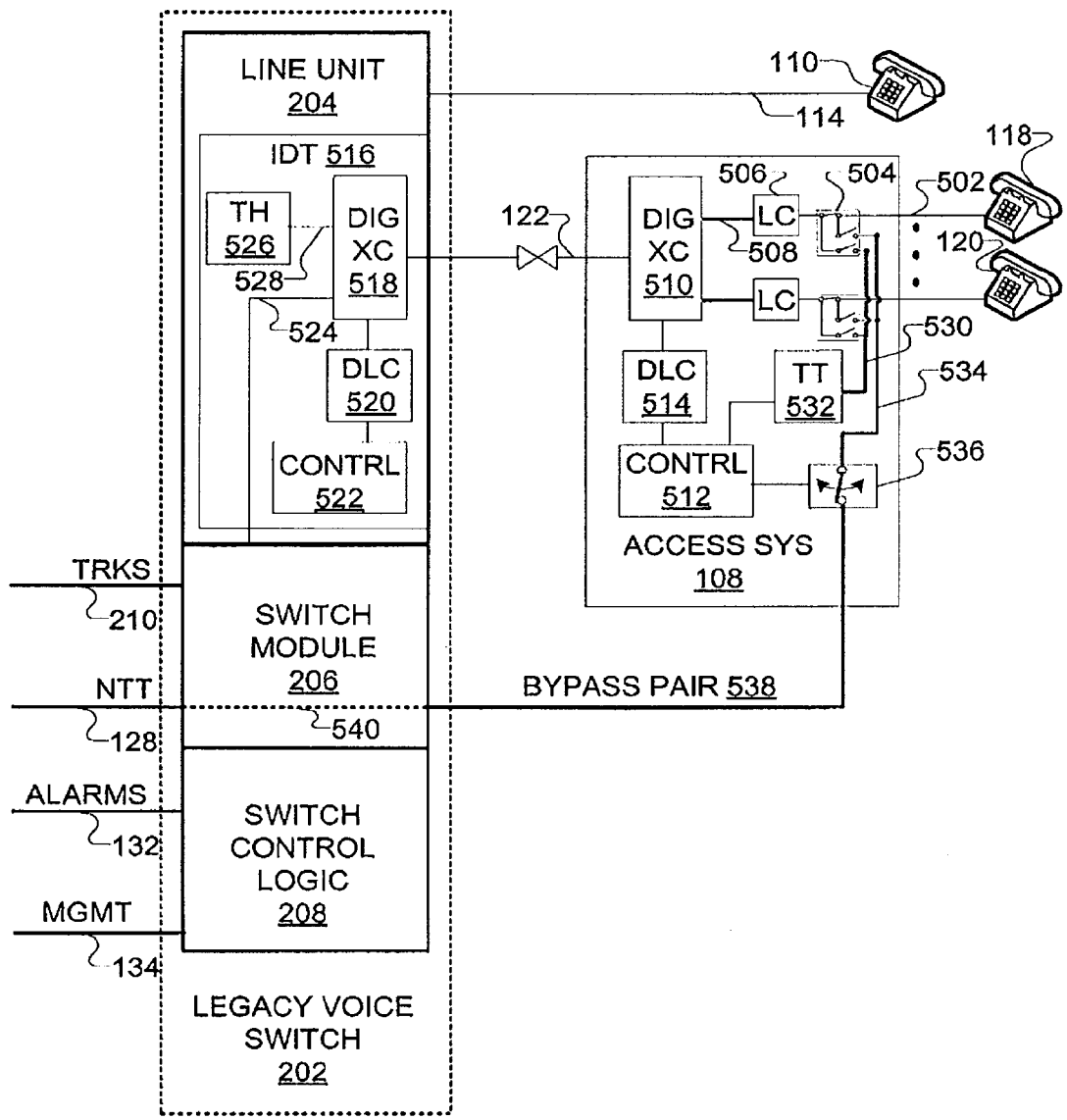
FIG. 5 is a block diagram illustrating the management of an access system operating in conjunction with a voice switch in a legacy environment.

Returning briefly to FIG. 1, the foregoing discussion addressed how subscriber lines, such as 114, terminating directly on LAG 102 may be tested in such a way that is indistinguishable from interaction with a legacy voice switch. However, as yet, the plurality of subscribers 118, 120 served by access system 108 have not been addressed. To facilitate understanding of this aspect of the invention, FIG. 5 expands the detail of FIG. 1 to assist the reader in understanding the operation of access system 108 interoperating with a legacy voice switch 202. These details are a generic representation of the operation of the access system 108 as is well understood in the art and does not constitute a part of the instant invention. In FIG. 5, subscriber line 502 passes through test access switch 504 en route to line circuit (LC) 506 which, in a like manner to previous discussions, converts and adapts telephone line analog interface 502 into a PCM stream 508. The PCM signal 508 is then cross-connected to the appropriate channel of one or more T1s 122 by means of a digital cross-connect (DIG XC) 510 responsive to controller (CONTRL) 512. Furthermore controller 512 communicates to the legacy switch 202 by means of a data link that is adapted by data link controller (DLC) 514 and introduced into T1 122 by means of digital cross-connect 510. There exists on legacy switch 202 a companion interface frequently referred to as an "Integrated Digital Terminal" (IDT) 516 incorporating digital cross-connect (DIG XC) 518, data link controller (DLC) 520, and controller (CONTRL) 522. In a like manner to access system 108, bearer PCM traffic is switched by digital cross-connect 518 to switch module 206 (signal 524) for connectivity to the greater PSTN and a data link exists between IDT controller 522 and access system controller 512 that allows coordination of both systems. This data link may be proprietary or conformant to standards such as GR-303 or GR-08, maintained and published by Telcordia Technologies and is well known in the art. In usual practice, IDT 516 exercises control over the interaction between IDT 516 and access system 108 and there exists in IDT 516 a test head (TH) 526 responsive to controller 522 and connected to digital cross-connect 518 by signal 528 which can terminate a PCM stream from a line circuit in access system 108 for test purposes that is very similar in function to that of test head 376 in FIG. 3.

When the switch module 206 recognizes the beginning of a test request occurring on NTT 128 and receives a directory number (DN) that it recognizes is associated with IDT 516 this is communicated to controller 522 in terms that associate this DN to a particular line appearance on an access system served by IDT 516. For the purposes of this discussion, assume that line 502 of access system 108 is the subject of the test request, IDT controller 522 communicates this over the data link to controller 512 of access system 108 and causes test head 526 to be placed on the PCM stream assigned to line circuit 506. In response, controller 512 of access system 108 configures test access switch 504 into the test mode thus connecting analog side of LC 506 to test-in bus 530 and hence to test termination module (TT) 532 and connecting subscriber line 502 to test-out bus 534 and hence to switch 536 all in a manner similar to that discussed in relation to FIG. 3. In addition, a component unique to interfacing with access systems is required, "bypass pair" 538 provides metallic continuity between switch module 206 and access system 108 for the purposes of "extending" the test pair (tip and ring) of NTT 128 when appropriate. This bypass pair is well known in the art and may be realized by a physical pair of wires or virtually through electronic means to appear electrically metallic and may be shared among several access systems. When switch module 206 switches NTT 128 through to bypass pair 538 (shown as dotted line 540) there now exists: metallic continuity between NNT 128 and subscriber line 502, a PCM connection between test head 526 and LC 506, as well as metallic continuity the line side of LC 506 and test termination module 532.

Figure 6:
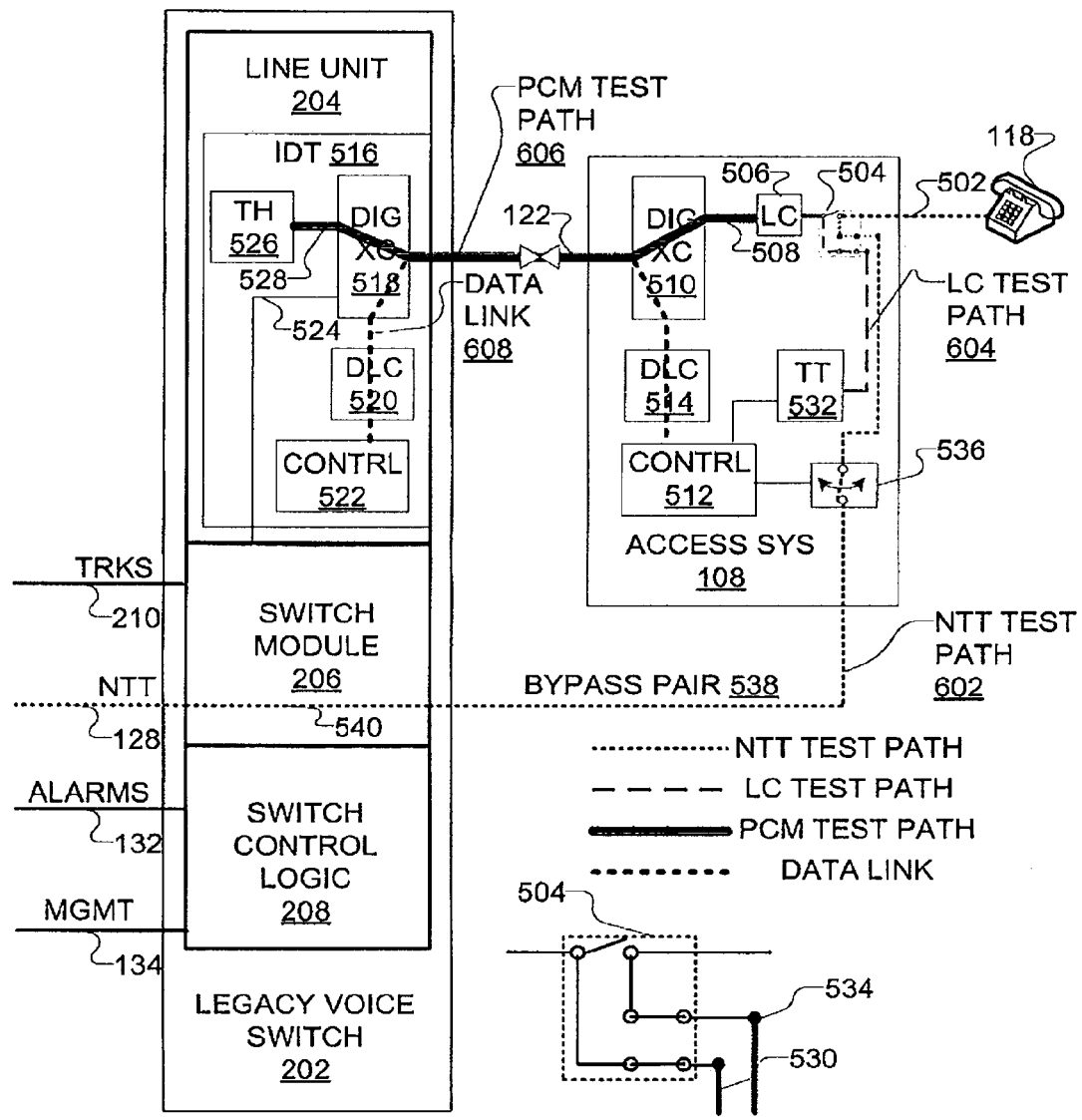
FIG. 6 is a block diagram clarifying how the loop test is performed on a subscriber line terminated on an access system operating in conjunction with a voice switch in a legacy environment.

FIG. 6 summarizes the test connectivity at a high level by removing some of the details of FIG. 5. The metallic access of NTT 128 test pair to subscriber line 502 is shown as dotted line 602 (NTT TEST PATH), metallic test access between the subscriber side of LC 506 and the test termination module (TT) 530 is shown as dashed line 604 (LC TEST PATH), and PCM access between LC 506 and test head (TH) 526 is shown as grey highlight 606 (PCM TEST PATH). While NTT 128 is testing subscriber pair 504, IDT 516 communicates to access system 108 via logical data link 608 causing specific terminations to be placed on the analog side of LC 504 by means of test termination module 532 which are then tested against by test head 526 in a like manner to the discussion relating to FIG. 3. The testing configuration above is consistent with GR-08 which specifies test termination module 532 provide: open circuit (nominal case), short circuit ("reflective load"), and the nominal terminating impedance, usually 900 Ohms, ("absorptive load"). The short circuit can be used to test for off-hook detection, verification of ring trip, and reflection of a tone back to the source (hence "reflective load") the level of which can be used to estimate channel attenuation. The nominal terminating impedance will appropriately terminate the channel and thus result in minimal reflection of a test tone (hence "absorptive load") the level of which is used to estimate return loss. Also, measurement of the reflected signal in the absence of a tone can be used to estimate idle channel noise.

Figure 7:
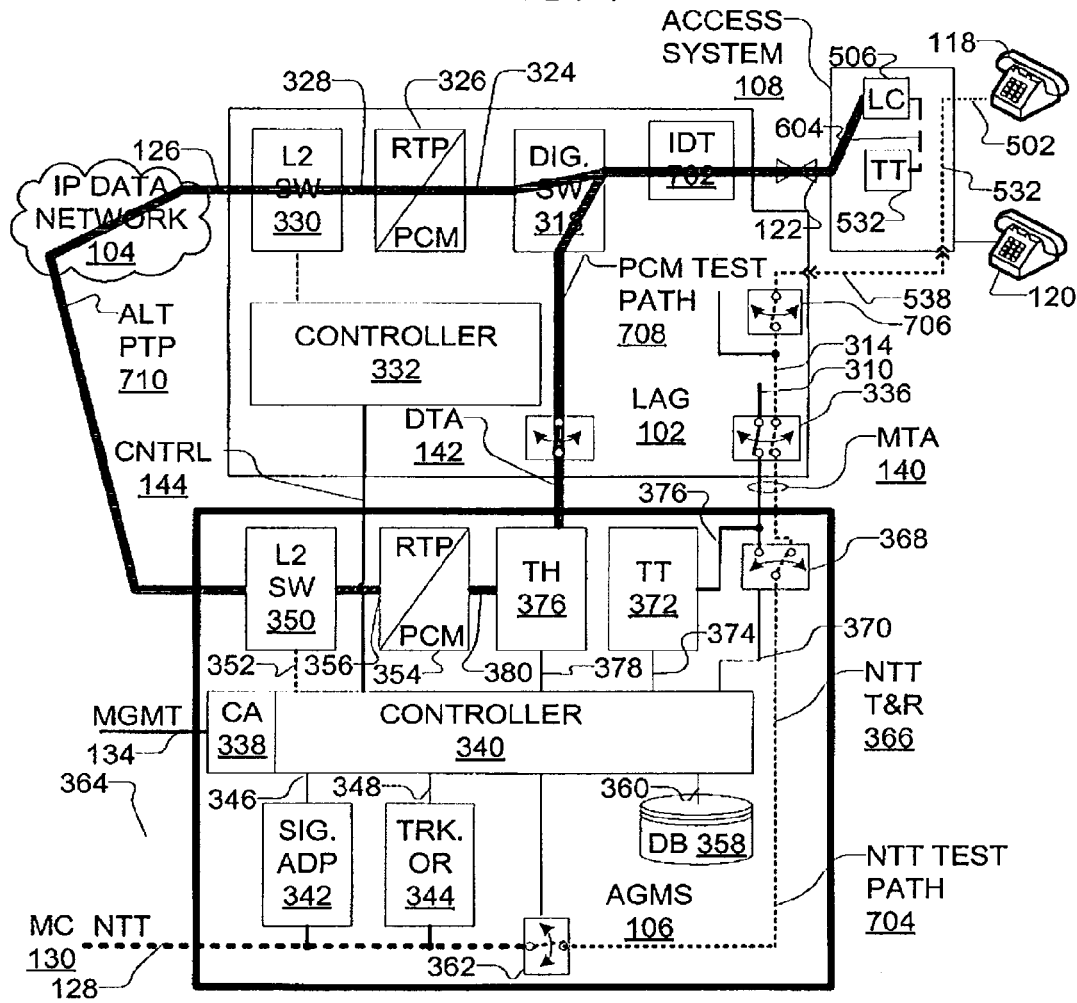
FIG. 7 is a block diagram illustrating how the AGMS can accommodate the test of subscriber lines terminated on access systems through an access gateway; and, FIG. 8 is a block diagram providing additional details illustrating how the AGMS adapts to legacy synchronization and alarm interfaces.

FIG. 7 illustrates how subscribers served by an access system which, in turn, is terminated on LAG 102 can be accommodated by AGMS 106. Logically it is apparent that LC 506 and test access switch 504 replace the functionality of LC 304 and test access switch 302 in LAG 102. Furthermore the test termination capabilities now reside in access system in the form of test termination module 532. For clarity and convenience, in FIG. 7 access system 108 is configured in the test state as it was left in FIG. 6 and certain details and reference designators have been omitted. Also it is assumed in FIG. 7 that a test sequence has been initiated through in the same manner as was discussed in conjunction with FIG. 3 and that the subscriber line requested for test corresponds to subscriber line 502 on access system 108. Accordingly prior to the test access being set up, AGMS 106 communicated to LAG 102 the subscriber identification (DN, IP address, or other unique identifier) that LAG 102 associated with subscriber line 502. Then IDT functionality 702, within LAG 102, causes access system 108 to make subscriber line 502 available for test in the same manner as a legacy switch described in conjunction with FIG. 6. As a result, NTT 128 has metallic continuity to subscriber line 502, shown as dotted line (NTT TEST PATH) 704, via bypass pair 538, switch 706, access system test-out bus 314 and the like as discussed in conjunction with FIG. 3. Switch 706 can be used to advantageously isolate bypass pairs from the internal line circuit test-out bus 314. Similarly the analog side of line circuit 506 has metallic continuity with test termination module 532 by means of LC test path 604, all resident within access system 108. As before (see FIG. 4), and in an analogous manner, a direct PCM test path (PCM TEST PATH) 706 and indirect PCM test path (ALT PTP) 710 (both shown with grey outline) can be established between LC 504 and test head (TH) 376 using T1 122, IDT 702, and digital switch 318.

In FIG. 7 wherein the subscriber line under test 502 is terminated on access system 108, PCM channel test proceeds similarly to that of a subscriber line terminating directly on LAG 102 with some noteworthy exceptions. The ensemble of test terminations to which the line circuit 506 may be exposed to on the analog side is limited to those provided by test termination module 532 which, in turn, may be dictated by the by interface protocol supported by access systems 108. Furthermore, the order in which these terminations are presented may be forced by the protocol. For example, GR-08, as discussed earlier, has three specific test terminations defined: open circuit, short circuit, and "absorptive" and although the order in which these terminations are applied is not explicitly defined, the process proceeds more expeditiously when some discipline is introduced. It is therefore advantageous for AGMS 106 to be aware of the protocol employed between IDT 702 and access system 108. This information related to the protocol active in access system 108 can be obtained from the relevant OSSs via the management (MGMT) channel 134, by interrogating LAG 102 over the control (CNTRL) channel 144 or by means of IP connectivity over the IP network 104, or be a part of provisioning data stored in database (DB) 358.

Accordingly, AGMS 106 instructs LAG 102 what termination is required for test termination module 532 to apply to line circuit 506 by means of control channel 144 or over the IP network 104 which then IDT 702 causes, by means of the protocol employed, to take place in access system 108. AGMS 106 then causes test head (TH) 376 to apply signals to the direct PCM test path 708, or the alternative PCM test path 710, and measures the reflected signal to verify the voice channel integrity. The PCM signals also carry signaling status in both GR-08 and GR-303 which test head 376 can use to verify that on/off hook and ring trip are occurring appropriately.

Another test sequence that is unique to applications employing a bypass pair is the "Bypass Pair Integrity Test" (BPIT) in which the IDT 702 may request that the access system 108 switch a diode and a 410 Ohm resistor across the bypass pair tip and ring conductors 538 oriented so that current will flow when the tip conductor is positive with respect to the ring conductor. This test allows the test system to verify the integrity of the bypass pair 538 and measure its resistance nominally prior to proceeding with the subscriber drop and PCM test sequences. This capability is specified in both GR-303 and GR-08 but is not a required component of the test sequence and is omitted from FIGS. 5, 6, and 7 for clarity. Operation of the BPIT is within the scope of this specification using the method and system outlined. Under certain circumstances, a bypass pair may not be practical, for example, over long distances in which case the PCM tests can proceed without connecting through the NTT to the subscriber drop. This, also is within the scope of this specification using the method and system outlined.

Figure 8:
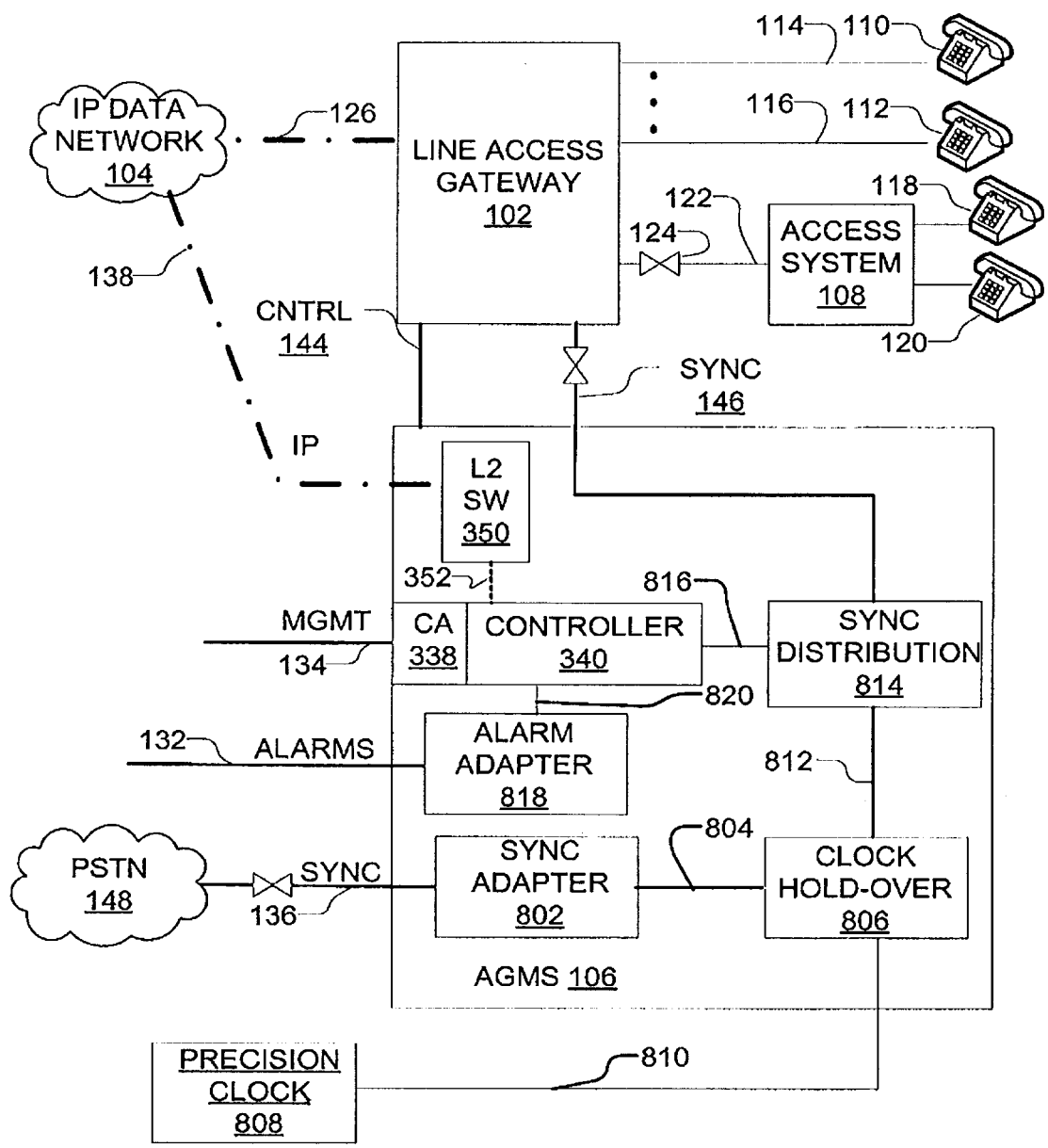

Moving on to FIG. 8, the details of synchronization and interfacing to legacy alarm circuits of AGMS 106 are considered in more detail. Synchronization signal 136 (SYNC) is normally derived from the PSTN 148 from very stable clock sources higher in the network hierarchy. The actual form of synchronization signal 136 may be a T1 or a specially adapted T1 known as a BITS (Building Integrated Timing Supply) and may be redundant (not shown) for reliability purposes. Synchronization adapter (SYNC ADAPTER) 802 recovers the clock signal 136 and passes it via signal 804 onto clock hold-over circuit (CLOCK HOLD-OVER) 806 which will typically have a precision oscillator that is trained to the synchronization signal in order to hold-over short intervals of loss of signal. This circuit may, in turn, have access to an external precision timing source (PRECISION CLOCK) 808 via signal 810 which can optionally be used to hold-over with more precision during longer synchronization outages. Clock hold-over circuit 806 by means of signal 812 feeds a synchronization circuit (SYNC DISTRIBUTION) 814 giving rise to synchronization signal 146 which can be used by LAGs that are equipped to use such a reference. Via signal 816 controller 340 is aware of synchronization timing and can generate IP-based timing protocols through signal 352, layer two switch 350, IP connectivity 138 and thence through the IP network 104.

The alarm adapter 818 of FIG. 8 illustrates how controller 340 through the IP network or management interface 134 can receive alarm inputs related to LAGs or other associated equipment and translate through signal means 820 those alarms into contact closures or other means such as serial communications channels to alert the legacy alarming systems through alarm interface 132.

A practitioner of the art will appreciate that the functionality of the AGMS 106 could advantageously be integrated into line access gateway 102 in some applications while remaining completely within the scope of these teachings.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

What is claimed is:

1. An access gateway management system for use in the management of Line Access Gateways (LAGs) in a VoIP network by means of legacy operational support systems, said access gateway management system comprising:
   a controller communicating with the LAG and VoIP network;
   a legacy operational support system management interface and communications means responsive to the controller whereupon management messages to and from the legacy operational support systems are adapted and communicated to subtended LAGs over the VoIP network; and
   a clock hold-over means responsive to the controller providing a stable timing source; whereupon the controller adapts and transmits timing information over the VoIP network to subtended LAGs, wherein the clock hold-over means comprises an oscillator trained to the legacy synchronization signal, wherein the clock hold-over means receives a recovered signal from the synchronization adapter and passes the timing source to a synchronization distribution circuit.

2. The access gateway management system of claim 1 further comprising support for TL-1 (Transaction Language-1) protocol for use in communicating with legacy operational support systems.

3. The access gateway management system of claim 1 further comprising adaptation to SNMP (Simplified Network Management Protocol) for communications with subtended LAGs over the VoIP network.

4. The access gateway management system of claim 1, wherein the management interface communicates with the legacy operational support systems in a manner analogous to that of a legacy voice switch while translating and communicating relevant management information to and from the subtended LAGs.

5. The access gateway management system of claim 1, further comprising a test head in communication with the controller, the test head responsive to the controller to direct calibrated tones to line circuits in the subtended LAGs.

6. The access gateway management system of claim 1, further comprising a test termination module in communication with the controller configured to apply a plurality of terminations across tip and ring of line circuits in the subtended LAGs.

7. The access gateway management system of claim 1, wherein the management interface receives alarm inputs related to the subtended LAGs.

8. An access gateway management system for use in providing synchronization for Line Access Gateways (LAGs) in a VoIP network by means of legacy synchronization signals, said legacy synchronization system derived from the circuit-switched network (PSTN) and supplying T1-based synchronization signal, said access gateway management system comprising:
   a controller communicating with the LAG and VoIP network;
   a synchronization adapter responsive to the controller interfacing to legacy synchronization signal; and
   a clock hold-over means responsive to the controller providing a stable timing source; whereupon controller adapts and transmits timing information over the VoIP network to subtended LAGs, wherein the clock hold-over means comprises an oscillator trained to the legacy synchronization signal, wherein the clock hold-over means receives a recovered signal from the synchronization adapter and passes the timing source to a synchronization distribution circuit.

9. The access gateway management system of claim 8 further comprising a synchronization distribution means for disseminating timing information to subtended LAGs using conventional T1-based signals.

10. The access gateway management system of claim 8, wherein the synchronization adapter receives and recovers the legacy synchronization signal, further wherein the legacy synchronization signals comprises a Building Integrated Timing Supply (BITS) signal from a public switched telephone network.

11. The access gateway management system of claim 8, wherein the clock hold-over means receives a recovered signal from the synchronization adapter and passes the timing source to a synchronization distribution circuit.

12. The access gateway management system of claim 8 for use in the management of the LAGs in the VoIP network by means of legacy operational support systems, said access gateway management system further comprising:
- a legacy operational support system management interface and communications means responsive to the controller whereupon management messages to and from the legacy operational support systems are adapted and communicated to subtended LAGs over the VoIP network.

13. The access gateway management system of claim 8 for use in adapting alarm information from the LAGs in the VoIP network by means of legacy alarm signals, said legacy alarm system interfacing to local alarm means and alarm telemetry systems, said access gateway management system further comprising:
- a legacy alarm interface responsive to the controller whereupon alarm information received from the subtended LAGs over the VoIP network is adapted and communicated to the legacy alarm systems.

14. The access gateway management system of claim 8, further comprising a test head in communication with the controller, the test head responsive to the controller to direct calibrated tones to line circuits in the subtended LAGs.

15. The access gateway management system of claim 8, further comprising a test termination module in communication with the controller configured to apply a plurality of terminations across tip and ring of line circuits in the subtended LAGs.

16. An access gateway management system for use in adapting alarm information from Line Access Gateways (LAGs) in a VoIP network by means of legacy alarm signals, said legacy alarm system interfacing to local alarm means and alarm telemetry systems, said access gateway management system comprising:
- a controller communicating with the LAG and VoIP network;
- a legacy alarm interface responsive to the controller whereupon alarm information received from the subtended LAGs over the VoIP network is adapted and communicated to the legacy alarm systems; and
- a clock hold-over means responsive to the controller providing a stable timing source; whereupon the controller adapts and transmits timing information over the VoIP network to subtended LAGs, wherein the clock hold-over means comprises an oscillator trained to the legacy synchronization signal, wherein the clock hold-over means receives a recovered signal from the synchronization adapter and passes the timing source to a synchronization distribution circuit.

17. The access gateway management system of claim 16 further comprising adaptation of alarm information to legacy alarm systems; said alarm information obtained using SNMP (Simplified Network Management Protocol) for communications with subtended LAGs over the VoIP network.

18. The access gateway management system of claim 16 further comprising a legacy operational support system management interface for reporting alarm information obtained from subtended LAGs over the VoIP network.

19. The access gateway management system of claim 16 further comprising a legacy operational support system management interface for reporting alarm information; said alarm information obtained using SNMP (Simplified Network Management Protocol) for communications with subtended LAGs over the VoIP network.

20. The access gateway management system of claim 16 further comprising a legacy operational support system management interface for reporting alarm information whereupon the TL-1 (Transaction Language-1) protocol is employed; said alarm information obtained from subtended LAGs over the VoIP network.

21. The access gateway management system of claim 16, wherein the alarm interface provides relay contact closures for signaling out to local alarming systems.

22. The access gateway management system of claim 16, wherein the controller further receives alarm information over a management interface.

* * * * *